United States Patent
Xue (10) Patent No.: US 9,898,606 B1
(45) Date of Patent: Feb. 20, 2018

(54) PREVENTING UNINSTALLATION OF APPLICATIONS

(71) Applicant: Symantec Corporation, Mountain View, CA (US)

(72) Inventor: Yong Ling Xue, Beijing (CN)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/527,499

(22) Filed: Oct. 29, 2014

(51) Int. Cl.
*G06F 21/00* (2013.01)
*G06F 21/57* (2013.01)
*G06F 21/50* (2013.01)

(52) U.S. Cl.
CPC .............. *G06F 21/57* (2013.01); *G06F 21/50* (2013.01)

(58) Field of Classification Search
CPC ............................... G06F 21/562; G06F 21/56
See application file for complete search history.

(56) References Cited

U.S. PATENT DOCUMENTS

| 2010/0275252 | A1* | 10/2010 | Yun | G06F 21/121 726/7 |
| 2013/0067577 | A1* | 3/2013 | Turbin | G06F 21/562 726/24 |
| 2014/0283044 | A1* | 9/2014 | Chen | G06F 8/62 726/22 |
| 2015/0227752 | A1* | 8/2015 | Anakata | G06F 21/629 726/29 |

FOREIGN PATENT DOCUMENTS

CN 103984576 A * 8/2014

OTHER PUBLICATIONS

"Android Device Policy Administration Tutorial", Ken Jones, Oct. 11, 2012.*

* cited by examiner

*Primary Examiner* — Brandon Hoffman
*Assistant Examiner* — Helai Salehi
(74) *Attorney, Agent, or Firm* — Holland & Hart LLP (57) ABSTRACT

A method for preventing application uninstalls on devices is described. In one embodiment, the method includes identifying granted device administrator permissions in association with an application installed or being installed on a device, monitoring the device relative to the granted device administrator permissions, and suspending a callback function to prevent the device from enabling revocation of the granted device administrator permissions.

18 Claims, 7 Drawing Sheets

PREVENTING UNINSTALLATION OF APPLICATIONS

BACKGROUND

Advancements in media delivery systems and data-related technologies continue to increase at a rapid pace. Increasing demand for accessible data has influenced the advances made to data-related technologies. Computer systems have increasingly become an integral part of data creation, data usage, and data storage. Computer systems may be used to carry out several data-related functions. The wide-spread access to data has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of and continued advancements in mobile computing products and systems. For example, advancements in mobile devices allow users to connect to corporate servers from anywhere in the world. Nevertheless, benefits may be realized by providing systems and methods for improving mobile computing systems.

SUMMARY

According to at least one embodiment, a method for preventing application uninstalls is described. In one embodiment, the method may include identifying granted device administrator permissions in association with an application installed or being installed on a device, monitoring the device relative to the granted device administrator permissions, and suspending a callback function to prevent the device from enabling revocation of the granted device administrator permissions. In some embodiment, the application may be installed on an ANDROID® operating system on the device. In some cases, suspending the callback function prevents a warning message from being displayed on the device.

In some embodiments, the method may include identifying a request to revoke the granted device administrator permissions. Upon identifying the request to revoke the granted device administrator permissions, the method may include identifying the callback function. The callback function may be implemented by the application. In some cases, the callback function may include a warning message requesting confirmation of the request to revoke the granted device administrator permissions.

In one embodiment, the method may include detecting the application implementing a device administration application programming interface (API). The application may be configured to handle the callback function via the device administration API. The method may include identifying a call to a predetermined function in relation to identifying the application implementing the device administration API. The predetermined function comprises a method to fetch a warning message and display the fetched warning message on the device. In some embodiments, upon identifying the request to revoke the granted device administrator permissions, the method may include preventing a result of the callback function from being returned to the application. In some cases, the method includes registering a receiver with an operating system of the device and running the registered receiver in a separate process to suspend the callback function.

A computing device configured for preventing application uninstalls on ANDROID® systems is also described. The computing device may include a processor and memory in electronic communication with the processor. The memory may store computer executable instructions that when executed by the processor cause the processor to perform the steps of identifying granted device administrator permissions in association with an application installed or being installed on a device, monitoring the device relative to the granted device administrator permissions, and suspending a callback function to prevent the device from enabling revocation of the granted device administrator permissions.

A non-transitory computer-readable storage medium storing computer executable instructions is also described. When the instructions are executed by a processor, the execution of the instructions may cause the processor to perform the steps of identifying granted device administrator permissions in association with an application installed or being installed on a device, monitoring the device relative to the granted device administrator permissions, and suspending a callback function to prevent the device from enabling revocation of the granted device administrator permissions.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to managed devices. More specifically, the systems and methods described herein relate to preventing application uninstalls in relation to mobile device management. Mobile device management (MDM) includes the administration of mobile devices, such as smartphones, tablets and laptops when linked to a corporate network. MDM functionality typically includes over-the-air distribution of applications, data and application monitoring, as well as data and configuration settings for all types of mobile devices, including mobile phones, smartphones, tablet computers, ruggedized mobile computers, mobile printers, mobile point of sale (POS) devices, etc. A typical MDM solution may include a server component, which sends out the management commands to the mobile devices, and a client component, which runs on the handset and receives and implements the management commands.

Presently, users of devices based on the ANDROID® operating system have the ability to uninstall any third party mobile applications installed on their device. In certain situations a user may not want a mobile application to be uninstalled. As one example, a user may install a security application (e.g., malware detection application, intrusion detection application, etc.) on his or her ANDROID® device. In most cases, the user may not want such a security application to be uninstalled from his or her ANDROID® device. As another example, a corporation may provide an employee with an ANDROID® device and/or provide a user access to one or more corporate-administered applications. As long as the user is with the corporation, the corporation may not want these corporate-administered applications to be removable from managed devices. With the ANDROID® device, however, any security and/or managed application remains removable. Thus, in some cases a user may unintentionally uninstall a security and/or managed application (e.g., a child playing with his or her parent's ANDROID® device, etc.). Likewise, malware on the ANDROID® device may be configured to uninstall the security and/or managed application.

In some cases, an application may be configured to request approval and/or confirmation before allowing the application to be modified or uninstalled. The ANDROID® operating system provides the capability for an installed application to run a callback function. The callback function calls back to the application to access a customized warning and/or confirmation with the user before permitting a requested action. Thus, as one example, such a confirmation callback may include a warning message such as "Are you sure you want to delete this application?" and/or user interface buttons such as "Okay" and "Cancel." Before allowing the device to be wiped/reset and/or deactivated/locked the device, the device may request that the user confirm his or her selection, preventing the user from enacting the selection until after the confirmation is selected. For example, in the case in which a device management application is installed on a device, the user may grant the management application administrative permissions such as monitoring data, sending reports, enabling data synchronization with corporate servers, etc. In some cases, a system administrator and/or developer may provide a device administration application that enforces remote/local device security policies. These policies may be hard-coded into the application, or the application may dynamically fetch policies from a server.

In one embodiment, the system prompts a user to enable the device administration application. Once the user enables the device administration application, the user is subject to its policies. Complying with those policies typically confers benefits, such as access to sensitive systems and data. If users do not enable the device administration application, the application may remain on the device, but in an inactive state. If left in the inactive state, the user may not be subject to its policies, and the user may conversely not get any of the application's benefits such as being able to synchronize data. In some cases, these administrative permissions may block the user from modifying and/or uninstalling the management application without confirming the user's selection. Thus, a user may select to uninstall the management application and as a result the management application may prompt the user to confirm that his or her intention is to revoke the administrative permissions and uninstall the application. In some cases, the application may include a message prompting the user to reconsider his or her selection. As one example, the prompt may state that disabling the management application is against corporate policy and doing so may result in the loss of at least some device functionality. Upon receiving the user's confirmation, the application may then be uninstalled. Thus, the application may not be uninstalled until after the user confirms his or her selection via the display of the callback message. Accordingly, uninstallation of an application and/or revoking of administrative permissions may be prevented by blocking the display of the warning message.

Current solutions may include using two applications to block the uninstallation of a single application. In the case of a security application, the original security application may be a first of the two applications and a monitoring application may be the second. The monitoring application may be configured to simply monitor the security application installed on the device. The installed security application may include administrator permissions that are granted as part of a user agreement specifying the conditions of use for the installed security application. Thus, the sole purpose of the monitoring application may be determine whether the security application is still installed and if not, perform some predetermined action. For example, upon detecting administrator permissions are revoked and/or the security application is uninstalled, the monitoring application may lock the device and display a message indicating the reason for the device being locked. Besides requiring two applications to be installed, the user may still be able to uninstall the security application.

The present systems and methods describe preventing an application from being uninstalled and/or administrator permissions from being revoked from an ANDROID® device, or any other type of operating system running on the device. The confirmation callback function may be viewed as a dependency rule that the ANDROID® operating system provides to installed applications. The uninstallation of an application depends on the confirmation callback function displaying a warning message or confirmation message. Thus, the methods described herein include suspending the confirmation callback function indefinitely in order to prevent the application from being uninstalled.

To respond to the callback, the application may implement an application programming interface (API) of a broadcast receiver. For example, the application may implement the Android Device Administration API, which provides device administration features at a system level and allows developers to create security-aware applications that are useful in enterprise settings. In some cases, the application may use onDisableRequested, a public method of the ANDROID® operating system that is called when a user asks to disable device administration, for example, providing the application the opportunity to present a warning message as described above. Meanwhile, the application may be configured to run a task-like receiver in a separate process. Accordingly, the method includes registering an ANDROID® receiver and running it in a separate process to create an infinite loop in the callback and prevent it from being returned. With the callback prevented from being returned, the user does not see any confirmation message from the callback. The method enables an application to indefinitely suspend the system graphical user interface (GUI) from displaying a confirmation message. Because an application cannot be uninstalled and/or an administrative permission revoked without the user viewing the confirmation message and confirming his or her selection, the application is prevented from being uninstalled. Thus, the methods described herein of preventing confirmation messages from being displayed and made accessible to end users enables organizations and developers to configure applications that cannot be removed by the end user.

Android application package (APK) is the package file format used to distribute and install application software and middleware onto GOOGLE's® ANDROID® operating system. BroadcastReceiver is a base class in the ANDROID® operating system for code that will receive intents sent by the method sendBroadcast( ). The receiver tag declares a BroadcastReceiver class that is available as part of a package's application components. Broadcast receivers enable applications to receive actions, intents, or data broadcasts that are broadcast by the system or by other applications, even when other components of the application are not running. Intents are messaging objects used to request an action from another application component. Although Intents facilitate communication between components in several ways, the main uses of Intents are for starting an activity, starting a service, and delivering a broadcast. In ANDROID®, an activity represents a single screen of a mobile application. An activity is typically a single interactive element of a mobile application that enables a user to do something. The Activity class takes care of creating a window in which a developer may place a user interface element such as a button, etc. While activities are often presented to the user as full-screen windows, they can also be used in other ways such as floating windows or embedded inside of another activity, etc. A service is a component that performs operations in the background without a user interface (e.g., downloading a file). A broadcast is a message that any mobile application installed on the device can receive. The system delivers various broadcasts for system events, such as when the system boots up or the device starts charging, etc.

Figure 1:
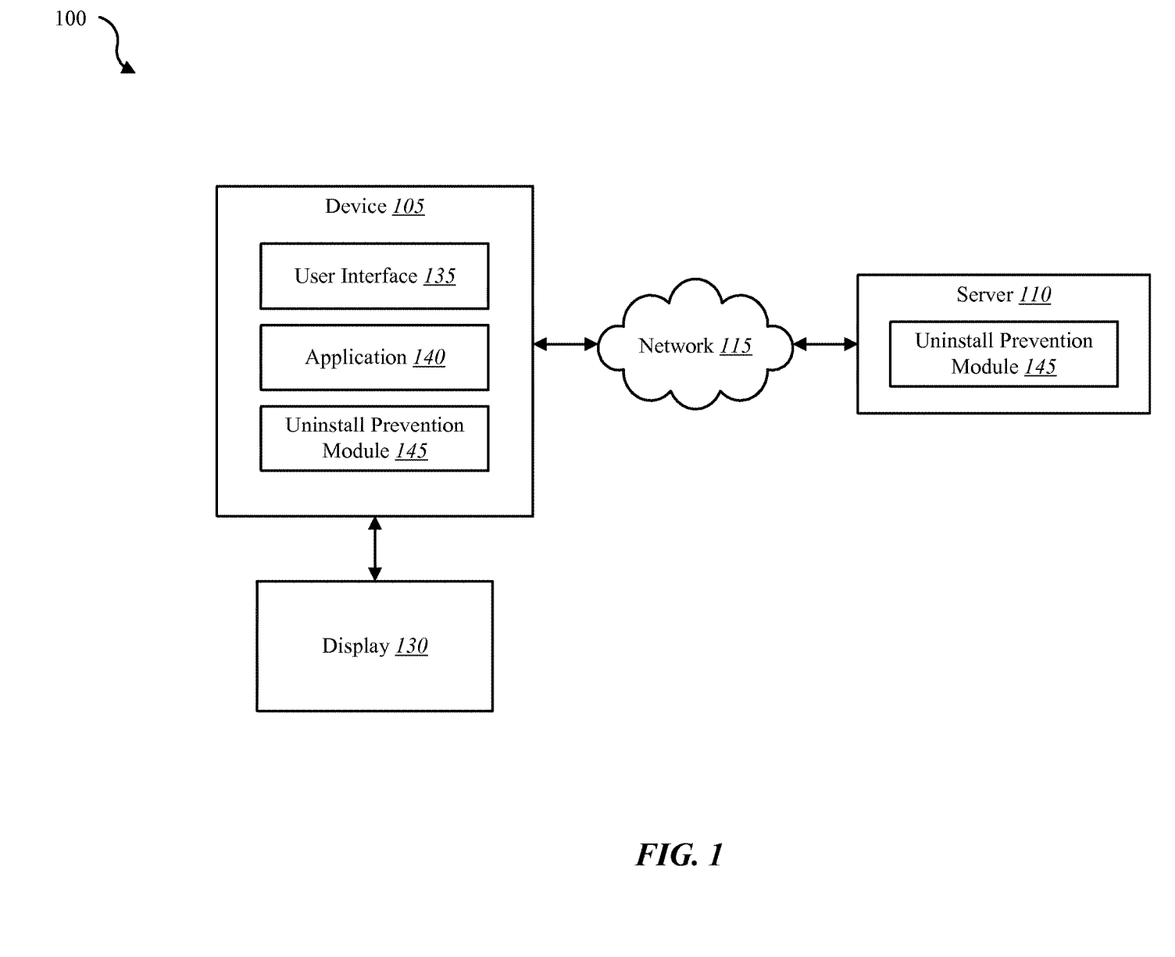
FIG. 1 is a block diagram illustrating one embodiment of an environment in which the present systems and methods may be implemented.

FIG. 1 is a block diagram illustrating one embodiment of an environment 100 in which the present systems and methods may be implemented. In some embodiments, the systems and methods described herein may be performed on a device (e.g., device 105). As depicted, the environment 100 may include a device 105, server 110, and a network 115 that allows the device 105 and server 110 to communicate with one another.

Examples of the device 105 may include any combination of mobile devices, smart phones, personal computing devices, computers, laptops, desktops, servers, media content set top boxes, satellite set top boxes, cable set top boxes, DVRs, personal video recorders (PVRs), etc. In some cases, device 105 may include a building automation controller integrated within device 105, or as depicted, may be in communication with an automation controller via network 115. Examples of server 110 may include any combination of a data server, a cloud server, a server associated with an automation service provider, proxy server, mail server, web server, application server, database server, communications server, file server, home server, mobile server, name server, etc.

In some configurations, the device 105 may include a user interface 135, application 140, and uninstall prevention module 145. Although the components of the device 105 are depicted as being internal to the device 105, it is understood that one or more of the components may be external to the device 105 and connect to device 105 through wired and/or wireless connections.

In some embodiments, device 105 may communicate with server 110 via network 115. Examples of network 115 may include any combination of cloud networks, local area networks (LAN), wide area networks (WAN), virtual private networks (VPN), wireless networks (using 802.11, for example), cellular networks (using 3G and/or LTE, for example), etc. In some configurations, the network 115 may include the Internet. It is noted that in some embodiments, the device 105 may not include an uninstall prevention module 145. For example, device 105 may include application 140 that allows device 105 to interface uninstall prevention module 145 located on another device such as server 110 or another computing device. In some embodiments, device 105 and/or server 110 may include an uninstall prevention module 145 where at least a portion of the functions of uninstall prevention module 145 are performed separately and/or concurrently on device 105 and/or server 110. Likewise, in some embodiments, a user may access the functions of device 105 directly or through device 105 via uninstall prevention module 145. For example, in some embodiments, a computing device may include a mobile application that interfaces with one or more functions of device 105, uninstall prevention module 145, and/or server 110.

Uninstall prevention module 145 may enable an administrator to prevent a user from revoking device administrator permissions from a device and/or prevent a user from uninstalling an application such as a mobile device management application. In some embodiments, uninstall prevention module 145 may be configured to perform the systems and methods described herein in conjunction with user interface 135 and application 140. Further details regarding the uninstall prevention module 145 are discussed below.

Figure 2:
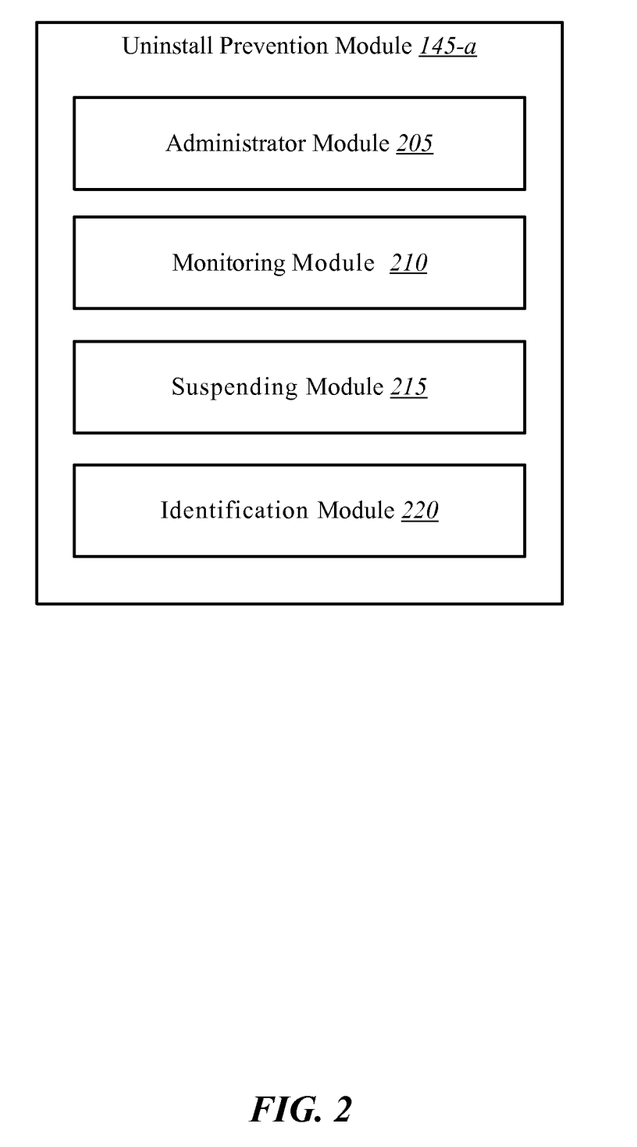
FIG. 2 is a block diagram illustrating one example of an uninstall prevention module.

FIG. 2 is a block diagram illustrating one example of an uninstall prevention module 145-a. Uninstall prevention module 145-a may be one example of uninstall prevention module 145 depicted in FIG. 1. As depicted, uninstall prevention module 145-a may include administrator module 205, a monitoring module 210, a suspending module 215, an identification module 220, an identification module 225, and a path estimation module 230.

The uninstall prevention module 145-a may be configured to prevent uninstallation of an application (e.g., application 140 of FIG. 1). In one embodiment, the application may be installed on an operating system installed on a mobile computing device such as the ANDROID® operating system. In one embodiment, administrator module 205 may identify granted device administrator permissions in conjunction with an application install. For example, a user of mobile device may install a mobile device management application in conjunction with a corporation where he or she is employed. The mobile device management application may include a method to request a user of the device to grant device administrator permissions. The device administrator permissions may include permissions for the application to install, upgrade, and uninstall software. Additionally, or alternatively, the device administrator permissions may include permissions for the application to monitor one or more applications, to send and receive data, to synchronize data with a corporate server, etc. Accordingly, in some embodiments, the administrator module 205 may identify device administrator permissions granted or being granted in association with an application installed or being installed on a device.

In one embodiment, suspending module 215 may suspend a callback function to prevent the device from enabling revocation of the granted device administrator permissions. In some embodiments, suspending the callback function may prevent a warning message from being displayed on the device. In some embodiments, identification module 220 may identify a request to revoke the granted device administrator permissions. Upon identifying the request to revoke the granted device administrator permissions, identification module 220 may identify the callback function. The callback function may be implemented by the application. The callback function may access a warning message stored on the device. The warning message may be provided by the application. Thus, the callback function may be configured to access the stored warning message and display it on the device. The warning message may include a message warning users regarding the request to revoke administrator permissions. For example, the warning message may warn that revoking administrator permissions may result in loss of connectivity to corporate resources such as corporate servers and/or loss of data synchronization, etc. The warning message may request confirmation regarding the request to revoke the granted administrator permissions such as an "Okay" button and a "Cancel" button. Upon detecting the "Cancel" button being touched, the device would cancel the request. Upon detecting the "Okay" button being touched, without the uninstall prevention module 145 the device would proceed to revoke the administrator permissions previously granted. The uninstall prevention module 145, however, prevents the device from displaying the warning message.

In one embodiment, monitoring module 210 may monitor the device relative to the granted device administrator permissions. For example, the monitoring module 210 may monitor for requests to revoke the granted administrator permissions. In some cases, monitoring module 210 may detect the device management application implementing a device administration application programming interface (API) in conjunction with the request to revoke the granted administrator permissions. The device management application may be configured to handle the callback function using the device administration API. The device administration API may include preconfigured methods that enable the device management application to send/receive data and/or messages in relation to the request to revoke the granted administrator permissions.

In one embodiment, identification module 220 may identify a call to a predetermined function in relation to identifying the application implementing the device administration API. The predetermined function may include a method to fetch a warning message and display the fetched warning message on the device. As one example, the identification module 220 may identify the ANDROID® method onDisableRequested, a method available from the ANDROID® Device Administration API.

Upon identifying the request to revoke the granted device administrator permissions, suspending module 215 may prevent a result of the callback function from being returned to the application. For example, suspending module 215 may block a warning message from being displayed on the device. Suspending module 215 may prevent a graphical user interface (GUI) of the device from displaying the warning message. To suspend the callback function, and thus suspend the warning message, the suspending module 215 may register a receiver with an operating system of the device and run the registered receiver in a separate process to suspend the callback function. For example, suspending module 215 may register a receiver on the ANDROID® operating system and run the registered receiver in a separate process in order to suspend the callback function. Suspending the callback function results in the warning message being suspended, and suspending the warning message prevents the granted device administrator permissions from being revoked. In some cases, to suspend the callback function the suspending module 215 may put the callback function in an infinite loop. Accordingly, uninstall prevention module 145 may prevent applications from being uninstalled from the device and/or prevent granted device administration permissions from being revoked.

Figure 3:
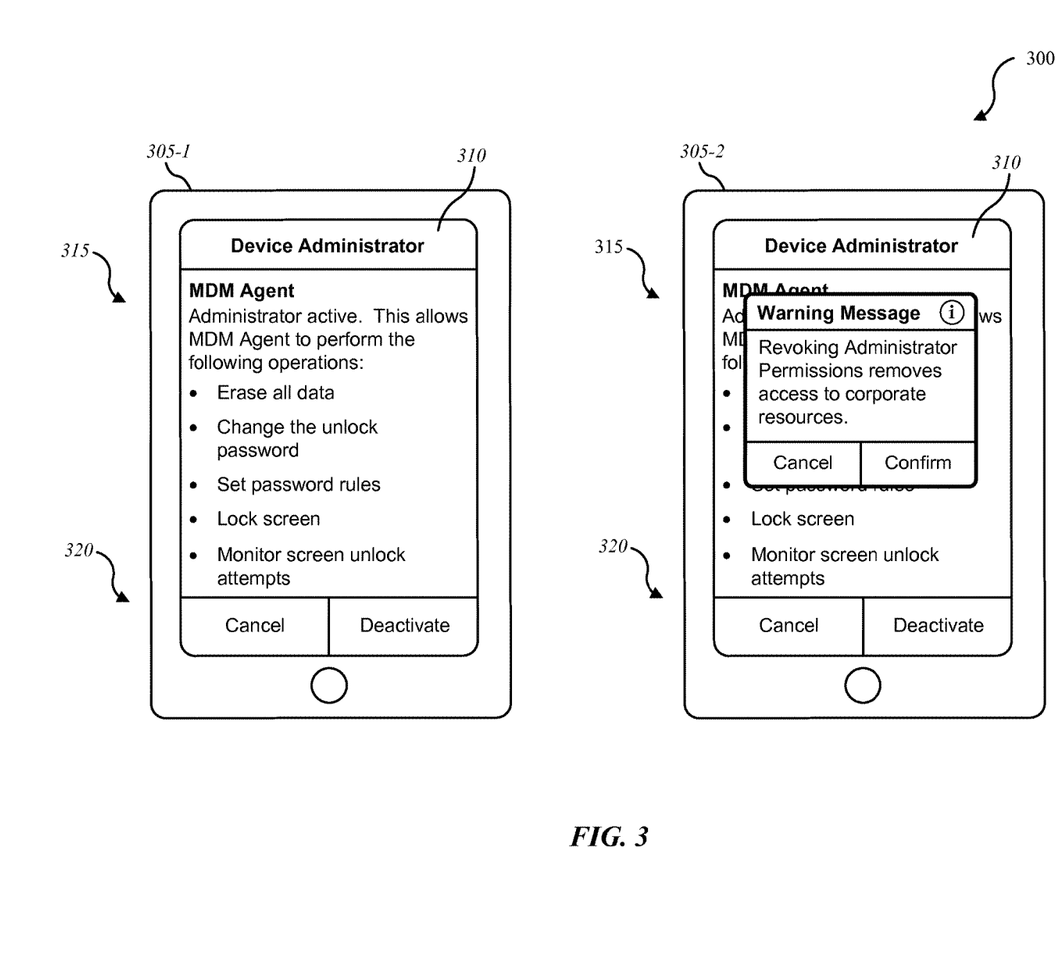
FIG. 3 is a block diagram illustrating one example of an environment for preventing application uninstalls.

FIG. 3 is a block diagram illustrating one example of an environment 300 for preventing application uninstalls in relation to a mobile device 305. Mobile device 305 may be one example of device 105 of FIG. 1. As depicted, the environment 300 may include a first instance of the mobile device 305-1 and a second instance of the mobile device 305-2. In each instance, the device 305 may include a title section 310, a description area 315, and a user interface 320. For example, as illustrated, the device 305 may include a title section 310 of "Device Administrator," indicating that a user selected to configure "Device Administrator" settings by navigating to a Settings section in the operating system of the device 305 and selecting "Device Administrator" from a list of configuration options. As illustrated in the first instance of the device 305-1, the description area 315 includes a description of an exemplary MDM software application "MDM Agent." The description area 315, as illustrated, explains that "MDM Agent" is active and that "MDM Agent" is allowed to perform certain operations such as "Erase all data," "Change the unlock password," and so forth. The user interface 320, as depicted, includes an option for a user to "Cancel" or "Deactivate." Selecting "Cancel" may cancel the user's selection of configuring "MDM Agent." Selecting "Deactivate" may disable "MDM Agent." Upon selecting "Deactivate," "MDM Agent" may use a callback function to fetch a warning message warning that deactivating "MDM agent" may result in the loss of certain rights, privileges, and/or functions. For example, disabling "MDM agent" may result in the loss of synchronization with corporate servers such as email servers. The description area 310 of the second instance of device 305-2 may illustrate the warning message fetched by the callback function. The warning message may enable the deactivation of "MDM Agent" to be canceled by pressing the "Cancel" button on the warning message. Alternatively, the deactivation of "MDM Agent" may be confirmed by pressing the "Confirm" button on the warning message. Accordingly, as described herein, uninstall prevention module 145 may enable an administrator and/or developer to prevent a user from revoking the "MDM Agent" device administrator permissions from device 305 and/or prevent a user from uninstalling "MDM Agent." Thus, when a user selects the "Deactivate" button in user interface 320, uninstall prevention module 145 may block the warning message illustrated in device 305-2 from being displayed, preventing a user from disabling "MDM agent."

Figure 4:
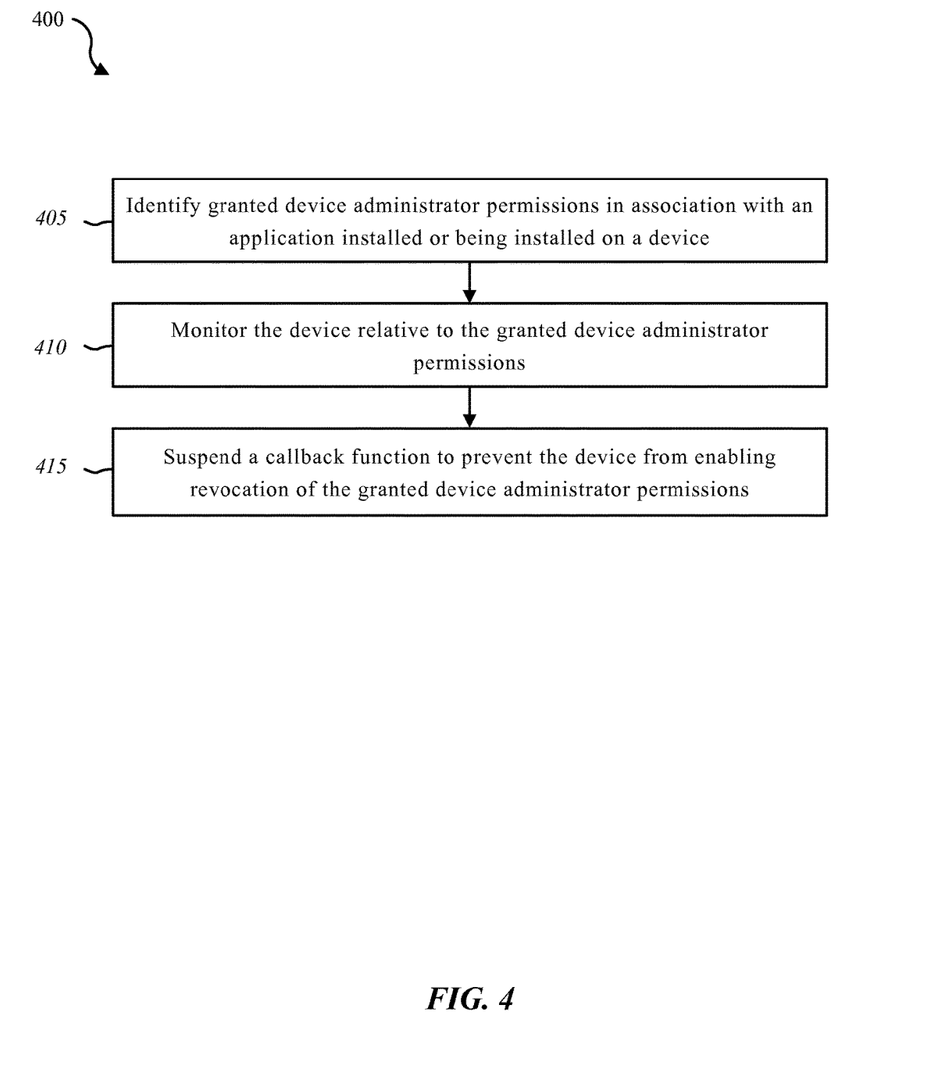
FIG. 4 is a flow diagram illustrating one embodiment of a method for preventing application uninstalls.

FIG. 4 is a flow diagram illustrating one embodiment of a method 400 for preventing application uninstalls. In some configurations, the method 400 may be implemented by the uninstall prevention module 145 illustrated in FIGS. 1 and/or 2. In some configurations, the method 400 may be implemented in conjunction with the application 140 and/or the user interface 135 illustrated in FIG. 1.

At block 405, device administrator permissions granted in association with an application installed or being installed on a device may be identified. The application may be installed on a device running the ANDROID® operating system. At block 410, the device may be monitored relative to the granted device administrator permissions. At block 415, a callback function may be suspended to prevent the device from enabling revocation of the granted device administrator permissions. Suspending the callback function may prevent a warning message from being displayed on the device.

Figure 5:
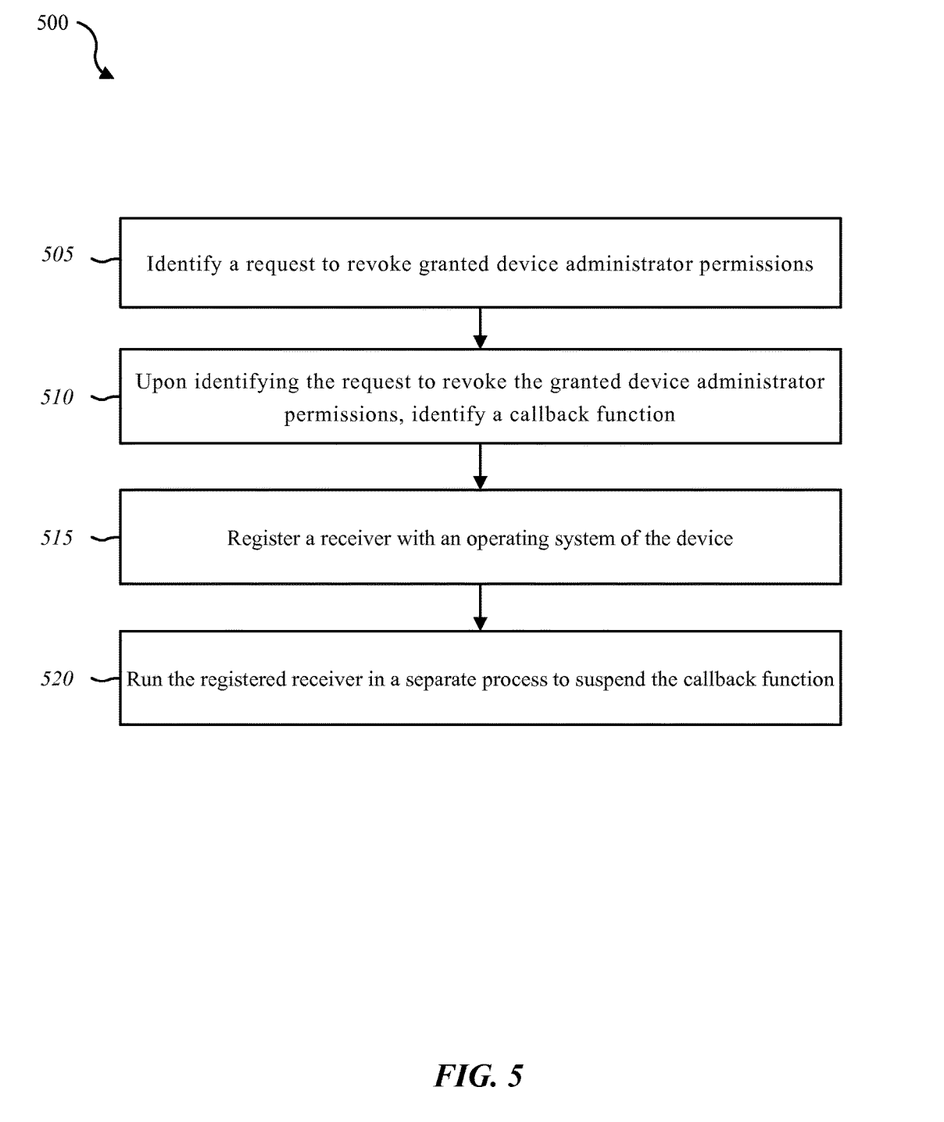
FIG. 5 is a flow diagram illustrating one embodiment of a method for preventing application uninstalls.

FIG. 5 is a flow diagram illustrating one embodiment of a method 500 for preventing application uninstalls. In some configurations, the method 500 may be implemented by the uninstall prevention module 145 illustrated in FIG. 1 or 2. In some configurations, the method 500 may be implemented in conjunction with the application 140 and/or the user interface 135 illustrated in FIG. 1.

At block 505, a request to revoke granted device administrator permissions may be identified. At block 510, upon identifying the request to revoke the granted device administrator permissions, a callback function may be identified. The callback function may be implemented by the application. In some cases, the callback function may include a warning message requesting confirmation of the request to revoke the granted device administrator permissions. In some cases, the method may include detecting the application implementing a device administration API. In some embodiments, the application may be configured to handle the callback function via the device administration API. The method may include identifying a call to a predetermined function in relation to identifying the application implementing the device administration API. The predetermined function may include a method to fetch a warning message and display the fetched warning message on the device. For example, the application may invoke the method onDisableRequested from the ANDROID® operating system. At block 515, a receiver may be registered with an operating system of the device. At block 520, the registered receiver may be ran in a separate process to suspend the callback function.

Figure 6:
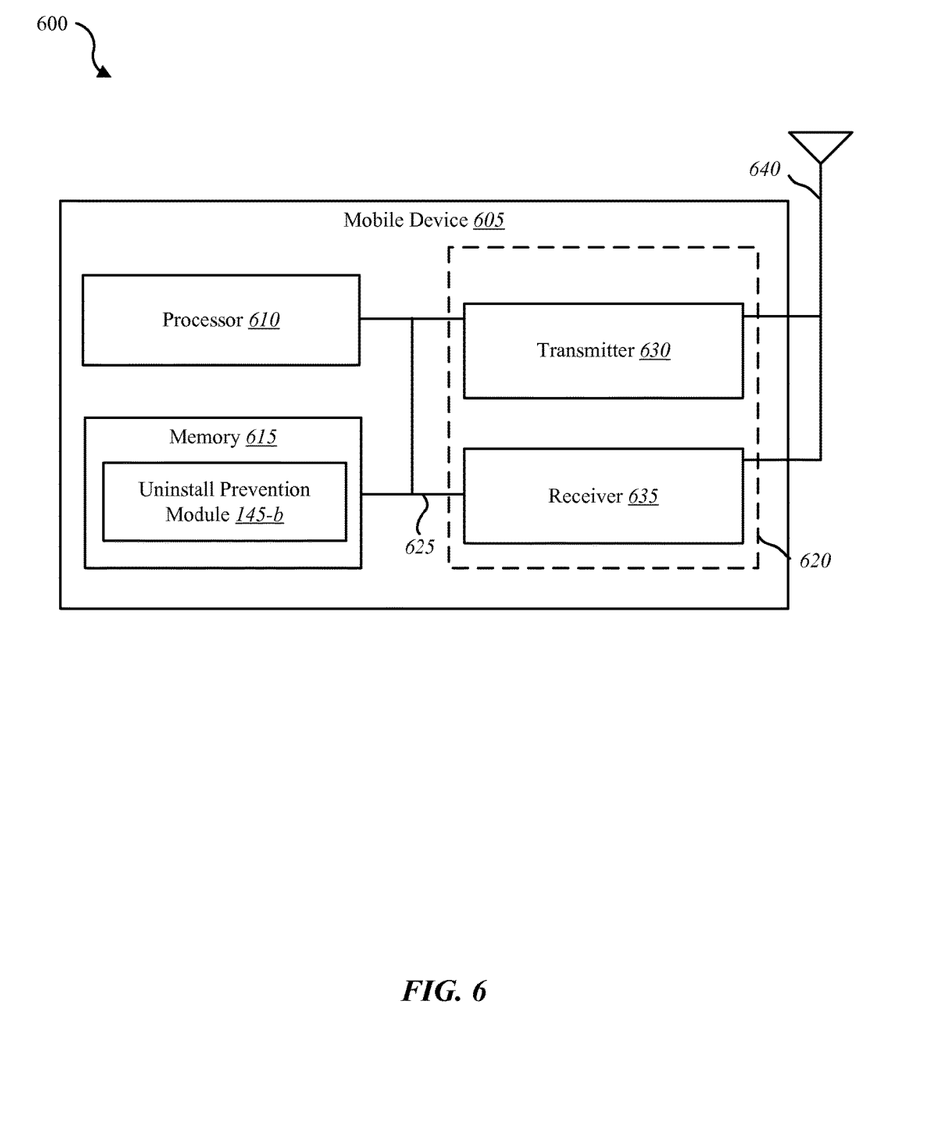
FIG. 6 depicts a block diagram of a computer system suitable for implementing the present systems and methods.

FIG. 6 depicts a block diagram of a computer system 600 suitable for implementing the present systems and methods. In one embodiment, the computer system 600 may include a mobile device 605. The mobile device 605 may be an example of a device 105 depicted in FIG. 1. As depicted, the mobile device 605 includes a bus 625 which interconnects major subsystems of mobile device 605, such as a central processor 610, a system memory 615 (typically RAM, but which may also include ROM, flash RAM, or the like), and a transceiver 620 that includes a transmitter 630, a receiver 635, and an antenna 640.

Bus 625 allows data communication between central processor 610 and system memory 615, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the uninstall prevention module 145-b to implement the present systems and methods may be stored within the system memory 615. The uninstall prevention module 145-b may be one example of the uninstall prevention module 145 depicted in FIGS. 1 and/or 2. Applications resident with mobile device 605 may be stored on and accessed via a nontransitory computer readable medium, such as a hard disk drive, an optical drive, or other storage medium. Additionally, applications can be in the form of electronic signals modulated in accordance with the application and data communication technology when accessed via a network.

Figure 7:
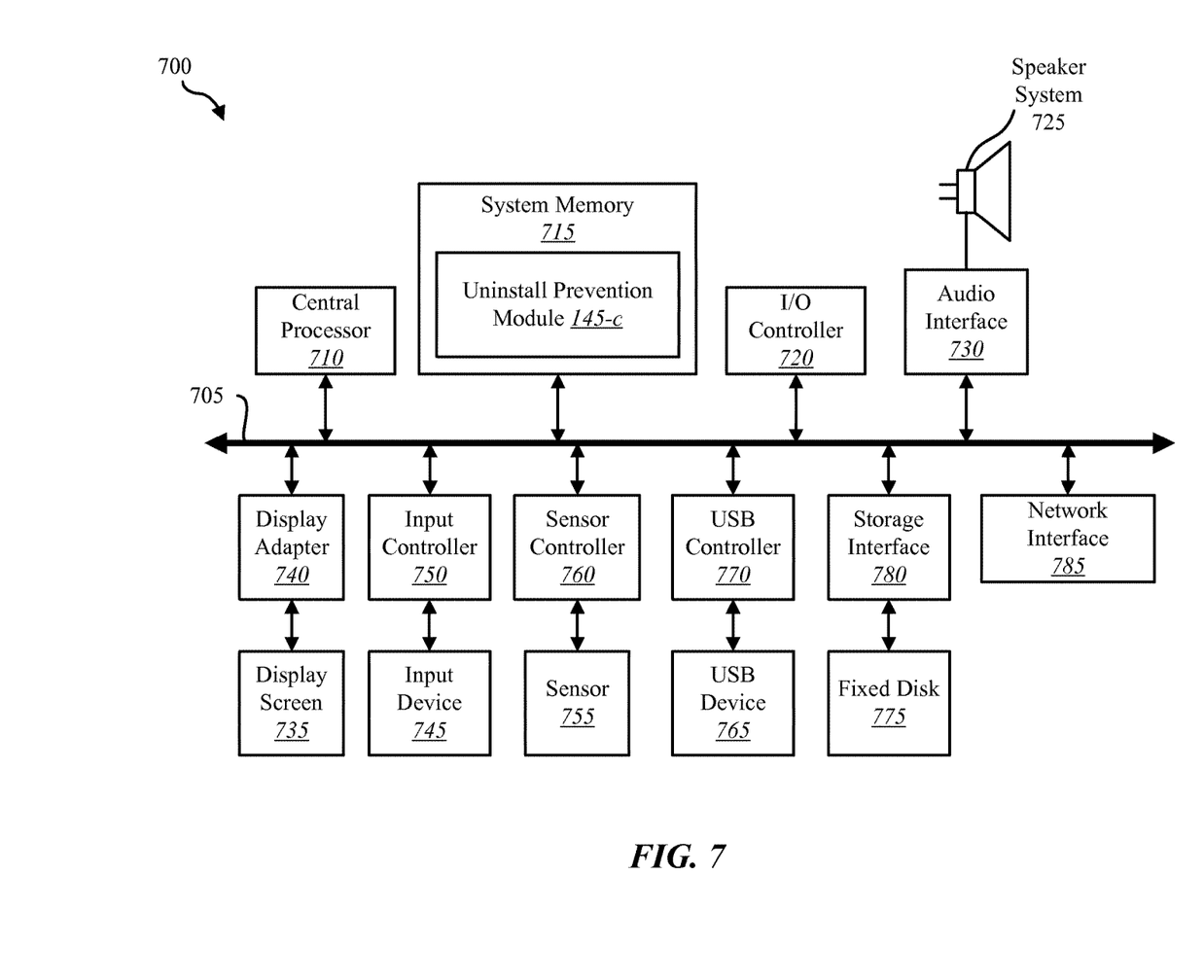
FIG. 7 depicts a block diagram of a computer system suitable for implementing the present systems and methods.

FIG. 7 depicts a block diagram of a computing device 700 suitable for implementing the present systems and methods. The device 700 may be an example of device 105 and/or server 110 illustrated in FIG. 1. In one configuration, device 700 includes a bus 705 which interconnects major subsystems of device 700, such as a central processor 710, a system memory 715 (typically RAM, but which may also include ROM, flash RAM, or the like), an input/output controller 720, an external audio device, such as a speaker system 725 via an audio output interface 730, an external device, such as a display screen 735 via display adapter 740, an input device 745 (e.g., remote control device interfaced with an input controller 750), multiple USB devices 765 (interfaced with a USB controller 770), and a storage interface 780. Also included are at least one sensor 755 connected to bus 705 through a sensor controller 760 and a network interface 785 (coupled directly to bus 705).

Bus 705 allows data communication between central processor 710 and system memory 715, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the uninstall prevention module 145-c to implement the present systems and methods may be stored within the system memory 715. The uninstall prevention module 145-c may be one example of the uninstall prevention module 145 depicted in FIGS. 1, 2, and/or 6. Applications (e.g., application 140) resident with device 700 are generally stored on and accessed via a non-transitory computer readable medium, such as a hard disk drive (e.g., fixed disk 775) or other storage medium. Additionally, applications can be in the form of electronic signals modulated in accordance with the application and data communication technology when accessed via interface 785.

Storage interface 780, as with the other storage interfaces of device 700, can connect to a standard computer readable medium for storage and/or retrieval of information, such as a fixed disk drive 775. Fixed disk drive 775 may be a part of device 700 or may be separate and accessed through other interface systems. Network interface 785 may provide a direct connection to a remote server via a direct network link to the Internet via a POP (point of presence). Network interface 785 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to device 700 wirelessly via network interface 785.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 7 need not be present to practice the present systems and methods. The devices and subsystems can be interconnected in different ways from that shown in FIG. 7. The aspect of some operations of a system such as that shown in FIG. 7 are readily known in the art and are not discussed in detail in this application. Code to implement the present disclosure can be stored in a non-transitory computer-readable medium such as one or more of system memory 715 or fixed disk 775. The operating system provided on device 700 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A method for preventing uninstallation of applications, comprising:
   identifying, by an application of a client device, granted device administrator permissions in association with the application installed on the client device;
   monitoring, by the application of the client device, actions associated with the application relative to the granted device administrator permissions;
   identifying, by the application of the client device, a request to revoke the granted device administrator permissions;
   suspending for a predetermined time period, by the application of the client device, a callback function, wherein the suspending comprises restricting a warning message from being displayed on the client device, and wherein the warning message comprises an option to confirm the request to revoke the granted device administrator permissions; and
   preventing, by the application of the client device, the client device from acting on the warning message to select the option to confirm the request to revoke the granted device administrator permissions and enable revocation of the granted device administrator permissions.

2. The method of claim 1, wherein suspending the callback function prevents the warning message from being displayed on the device.

3. The method of claim 1, comprising:
   upon identifying the request to revoke the granted device administrator permissions, identifying the callback function, the callback function being implemented by the application, and the callback function comprising the warning message requesting confirmation of the request to revoke the granted device administrator permissions.

4. The method of claim 1, comprising:
  detecting the application implementing a device administration application programming interface (API), the application being configured to handle the callback function via the device administration API.

5. The method of claim 1, comprising:
  upon identifying the request to revoke the granted device administrator permissions, preventing a result of the callback function from being returned to the application.

6. The method of claim 1, wherein the application is installed on an Android operating system on the device.

7. The method of claim 4, comprising:
  identifying a call to a predetermined function in relation to identifying the application implementing the device administration API.

8. The method of claim 5, comprising:
  registering a receiver with an operating system of the device; and
  running the registered receiver in a separate process to suspend the callback function.

9. The method of claim 7, wherein the predetermined function comprises a method to fetch the warning message and display the fetched warning message on the device.

10. A computing device configured for preventing uninstallation of applications, comprising:
  a processor;
  memory in electronic communication with the processor, wherein the memory stores computer executable instructions that when executed by the processor cause the processor to perform the steps of:
    identifying, by an application running on the processor, granted device administrator permissions in association with the application installed on the computing device;
    monitoring, by the application running on the processor, actions associated with the application relative to the granted device administrator permissions;
    identifying, by the application running on the processor, a request to revoke the granted device administrator permissions;
    suspending for a predetermined time period, by the application of the computing device, a callback function, wherein the suspending comprises restricting a warning message from being displayed on the computing client device, and wherein the warning message comprises an option to confirm the request to revoke the granted device administrator permissions; and
    preventing, by the application of the computing device, the computing device from acting on the warning message to select the option to confirm the request to revoke the granted device administrator permissions and enable revocation of the granted device administrator permissions.

11. The computing device of claim 10, wherein suspending the callback function prevents the warning message from being displayed on the device.

12. The computing device of claim 10, wherein the instructions executed by the processor cause the processor to perform the steps of:
  upon identifying the request to revoke the granted device administrator permissions, identifying the callback function, the callback function being implemented by the application, and the callback function comprising the warning message requesting confirmation of the request to revoke the granted device administrator permissions.

13. The computing device of claim 10, wherein the instructions executed by the processor cause the processor to perform the steps of:
  detecting the application implementing a device administration application programming interface (API), the application being configured to handle the callback function via the device administration API.

14. The computing device of claim 10, wherein the instructions executed by the processor cause the processor to perform the steps of:
  upon identifying the request to revoke the granted device administrator permissions, preventing a result of the callback function from being returned to the application.

15. The computing device of claim 13, wherein the instructions executed by the processor cause the processor to perform the steps of:
  identifying a call to a predetermined function in relation to identifying the application implementing the device administration API.

16. The computing device of claim 14, wherein the instructions executed by the processor cause the processor to perform the steps of:
  registering a receiver with an operating system of the device; and
  running the registered receiver in a separate process to suspend the callback function.

17. The computing device of claim 15, wherein the predetermined function comprises a method to fetch the warning message and display the fetched warning message on the device.

18. A non-transitory computer-readable storage medium storing computer executable instructions that when executed by a processor cause the processor to perform the steps of:
  identifying, by an application of a client device, granted device administrator permissions in association with the application installed or being installed on the client device;
  monitoring, by the application of the client device, actions associated with the application relative to the granted device administrator permissions;
  identifying, by the application of the client device, a request to revoke the granted device administrator permissions;
  suspending, for a predetermined time period, by the application of the client device, a callback function, wherein the suspending comprises restricting a warning message from being displayed on the client device, and wherein the warning message comprises an option to confirm the request to revoke the granted device administrator permissions; and
  preventing, by the application of the client device, the client device from acting on the warning message to select the option to confirm the request to revoke the granted device administrator permissions and enable revocation of the granted device administrator permissions.

* * * * *